Dec. 29, 1953  A. H. ISENBERG  2,664,112
SPACER PLATE FOR PIPES IN INSULATED CONDUITS
Filed Feb. 7, 1949
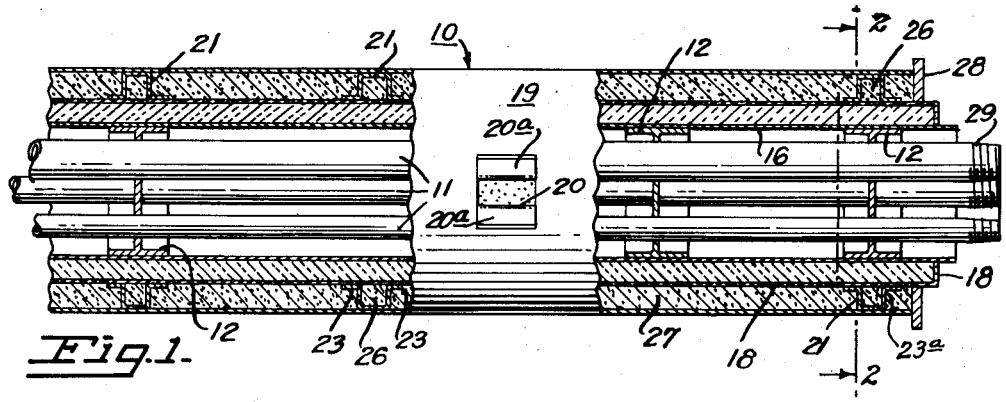
Fig. 1.
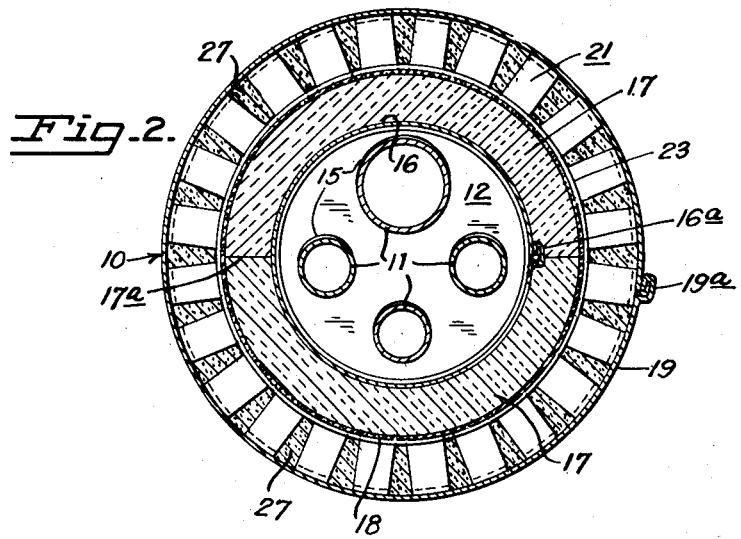
Fig. 2.
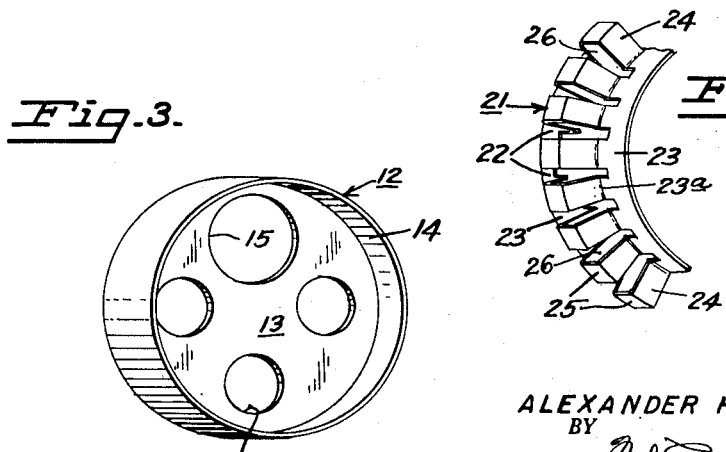
Fig. 3.
Fig. 4.
INVENTOR.
ALEXANDER H. ISENBERG
BY
ATTORNEY

Patented Dec. 29, 1953

2,664,112

UNITED STATES PATENT OFFICE 2,664,112

SPACER PLATE FOR PIPES IN INSULATED CONDUITS

Alexander H. Isenberg, Woodside, Calif.

Application February 7, 1949, Serial No. 75,027

3 Claims. (Cl. 138—64)

This invention relates to spacer plates for pipes in insulated conduits, and more particularly relates to spacer plates for conveyor pipes within a relatively thin forming casing which is thermally insulated and sealed by a moisture impervious solidifying fluid. Such conduits are adapted for preforming as units for burying in the ground in a subterranean conduit system.

It is customary in insulated underground conduits of preformed units to provide heavy rigid weight-supporting casings enclosing inner conveyor pipes, in which case both the casing and conveyor pipes are of relatively heavy rigid body material, such as cast iron or formed steel. In order to briefly differentiate the casings of this invention they are designated as forming casings, meaning thereby that both inner and outer casings are relatively thin sheet metal which separately are deformable and not adapted for independently supporting great weight, except as they are reinforced by other elements of the conduit, and, therefore, are more of the nature of a sheet metal tube serving as a forming mold for relatively positioning other supporting and insulating elements of the conduit.

Broadly the invention comprises providing a disc supporting plate in a composite conduit unit, the supporting plate having one or more apertures through which conveyor pipes slidably extend, the disc of the plate having a relatively broad circumferential rim or collar adapted for supporting over a large area the weight of relatively heavy conveyor pipes within a relatively thin inner casing which is enclosed in thermal insulating material, and the latter being surrounded by a relatively spaced thin outer casing for receiving therein around the thermal insulation a pourable solidifying moisture-impervious fluid such as asphaltic bitumen or the like.

A broad object of the invention to provide a composite thermal and moisture insulated conduit for supported conveyor pipes.

Another object of the invention is to provide a composite conduit unit having a plate support for conveyor pipes slidable therein responsive to longitudinal thermal expansion and contraction.

A further object is to provide in a composite conduit unit, a supporting spacer plate member for slidably supporting relatively heavy conveyor pipes upon a large bearing area within a relatively thin inner forming casing which independently has not sufficient weight-supporting strength.

With the foregoing and other objects in view, which will be apparent from or further set forth in this specification, one advantageous form in which the invention may be embodied is described herein and illustrated in the accompanying drawing, it being understood that variations of details may be resorted to without departing from the spirit and scope of the invention which is defined by the appended claims.

In the drawing:

Fig. 1 is a fragmentary longitudinal view of a conduit unit embodying the invention, the figure being partly broken away in section to show interior structure.

Fig. 2 is an enlarged view of a transverse section on line 2—2 of Fig. 1.

Fig. 3 is a perspective view of a supporting plate member for conveyor pipes, comparable in size to Fig. 2.

Fig. 4 is a fragmentary perspective view of spacer channel member corresponding in size to Fig. 2.

Referring to the drawing in which like reference characters indicate corresponding parts in the several views, 10 indicates generally a conduit unit of the insulated type for burying in the ground for conveying fluid at temperatures above or below the existing atmospheric temperatures, and usually employed for conveying hot water, steam, refrigerating fluids, and the like.

The conduit comprises one or more inner conveyor pipes 11 through which the conveyed fluid flows. The conveyor pipes 11 are relatively heavy and therefor substantially rigid as compared to forming casings to be described, the heavy conveyor pipes being supported by a spacer plate 12 comprising a rigid central circular disc 13 and a broad rigid integral circumferential rim 14 perpendicular to the plane of the disc, the disc preferably being centrally of the width of the rim and integrally formed therewith or welded thereto in fixed relation.

The disc 13 is perforated with a desired number of apertures 15 to receive therethrough the length of the conveyor pipes 11 which have snug slidable fit in the apertures. If there are more than one conveyor pipes the apertures 15 are suitably spaced so that each conveyor pipe is supported independently relatively.

Circumferentially of, and enclosing the rim 14 of the spacer plates and the conveyor pipes supported by the disc thereof, is a relatively thin hollow tubular inner forming casing 16, such as 26 to 22 gauge sheet metal which is bendable from sheet form into an elongated tube and is lamp-seamed as at 16a. A body of any suitable preformed thermal insulating material 17 is provided circumferentially of the exterior of the inner forming casing. The preformed insulating material is preformed into suitable length semi-circular in transverse section and of proper arc so that opposed face edges of oppositely mounted sections snugly fit in superficial contact as at 17a when a pair of complemental pieces are oppositely mounted around the inner forming casing. The exterior of the installed pieces of preformed insulating material is wrapped circumferentially and preferably helically with a suitable strip material 18 so that the insulating material is firmly positioned about the inner forming casing, and also protected from a moisture insulation to be described.

Circumferentially exterior of the wrappings 18, and spaced therefrom by means to be described, is a relatively thin outer forming casing 19, such as 26 to 22 gauge sheet metal. The outer forming casing like inner casing 16, may be formed by circumferential bending and having edges lap-seamed as at 19a, and being provided with pouring holes 20 spaced therealong. Closure flaps 20a may be provided at the edges of holes 20 by bending back the casing material when forming the pouring holes.

The spacing means between the wrapping 18 and the outer forming casing 19 comprises a spacer channel member 21 formed of an integral elongated blank strip of material having spaced transverse elongated cut-out portions 22 which leaves the opposite marginal edge portions of the elongated strip intact to provide spaced parallel bands 23 at the opposite edges of the blank. The longitudinal central portion of the blank strip is bent on parallel longitudinal lines 23a at the opposite end portions of the cut-outs 22, and is transversely formed angularly at substantially 80 to 90 degrees out of the plane of the band portions to provide opposed upstanding walls 24 joined by a top wall 25. The band portions 23 are formed as a collar snugly around the circumference of the wrapping 18 and the insulation material 17, and the opposite ends of the strip are suitably connected, such as by a lap-seam or weld, whereby the spacer channel is tightly positioned against movement. It will be observed that the circumferential bending of the strip expands the adjacent edges of the cut-out openings 22 and thus provides channels longitudinally of the conduit unit, and the void areas 26 between the upformed walls 24, 25, provide circumferential channels.

A moisture-impervious substance 27 such as mineral pitch or bitumen thermo, plastic asphalt which is liquid when heated and solidified at reasonable normal temperatures, is poured, while hot and extremely fluid, into the outer forming casing through the spaced openings 20, whereupon the asphalt flows lengthwise through spacer channel openings 22, and also circumferentially through the open area 26, until the space between the outer forming casing and the wraps 18 is completely filled. The fluid asphalt is then permitted to cool and solidify in situ, whereupon the pouring opening 20 is then closed by flaps 20a. During the pouring of the fluid asphalt the open ends of the receiving space may be temporarily closed by removable blocks 28, which are removed when the asphalt has solidified.

It is to be understood that the conduit is composed of preformed units to be laid underground, and the opposite ends of each unit are suitably closed with a portion of the conveyor pipe or pipes extending therebeyond as at 29, for connection by a suitable joint to a next adjoining similar preformed unit. However, the present invention relates specifically to a particular type of supporting spacer plate for supporting conveyor pipes in an insulated conduit unit without reference to any suitable type of joint for connecting adjacent similar conduit units.

It is preferred that the supporting spacer plate 12 and the spacer channel 21 be positioned in the same general transverse plane of the conduit, but it is to be understood that if desired, they may be additionally mounted in separate or staggered transverse planes, inasmuch as it may be desirable in very warm climates that there be greater number of spacer channels than spacer plates, whereas in very cold climate when utilizing high temperature steam under pressure in the conveyor pipes, causing greater contraction and expansion of the conveyor pipes, it may be desirable to employ a greater number of spacer plates than spacer channels.

By mounting the spacer plates 12 and spacer channels 21 in the same general transverse plane, the relatively broad rim 14 of the spacer plates provides a wide bearing surface for the weight of the conveyor pipes on the relatively thin inner forming casing 16 and thence upon the insulation 17, and upon spacer channels 21 which are rigidified by the surrounding solidified asphalt filler, and the relatively thin outer forming casing, none of which, other than supporting plate 12, are truly independently load-sustaining or weight-supporting elements. Since the conduit unit is buried in the ground, the vertical thrust of weight is thus transferred to the supporting ground, the forming casings, thermal insulation, spacer channel, and asphalt serving as fillers between the ground and the broad rim of the rigid load-sustaining spacer plate which carries the heavy conveyor pipes. Yet, the center disc 13 which, though rigid, is relatively thin provides a minimum of friction against the conveyor pipes extending therethrough, so that, upon longitudinal expansion and contraction of the conveyor pipes, they may readily move in the apertures 15 through which they extend.

The parts may be assembled in any of several ways, to suit individual preference and convenience. But to eliminate the unnecessary handling of weight of the relatively heavy conveyor pipe or pipes, it is preferred to first position spacer plates 12 in the tubular inner forming casing; next apply the preformed insulation 17 and the wrappings 18 therearound; next mount the spacer channels exterior of the wrapping 18 and slide the unit so formed longitudinally within the outer-forming casing, or optionally, fabricate the outer forming casing therearound by means of a lap seam 19a, whereupon the asphaltic compound is poured through the openings 20 which are closed by the flaps 20a when the asphalt has solidified. The conveyor pipes 11 are last inserted through the apertures 15.

Having described the invention, what is claimed as patentable is:

1. An insulated pipe conduit unit, including a relatively thin tubular outer forming casing, a relatively thin tubular inner forming casing within the outer forming casing and spaced therefrom, thermal insulation material circumferentially of said inner casing around the exterior thereof, spacer means between said inner and outer casings and circumferentially of the insulating material, and a spacer plate support within the inner casing comprising an apertured central disc portion transversely of the inner casing for receiving therethrough and supporting a plurality of conveyor pipes, said disc having a relatively wide rim circumferentially thereof and in substantially parallel contact with the inner casing, a moisture-impervious asphaltic thermoplastic body between the outer forming casing and the layer of thermal insulating material, and a plurality of relatively heavy conveyor pipes extending slidably through the apertures in the disc of the supporting plate, said relatively thin inner and outer casings being of bendable sheet metal and the conveyor pipes being substantially rigid.

2. An insulated pipe conduit unit having the elements of claim 1 and in which the spacer means between the respective inner and outer forming casings comprises an annular band having openings therethrough longitudinally of the inner and outer casing through which a fluid may flow.

3. An insulated pipe conduit unit having the elements of claim 1 and in which the spacer means between the respective inner and outer forming casings comprises an annular band having radially outwardly extended portions and having openings therethrough through which a fluid may flow, said opening being longitudinally and circumferentially of the inner and outer casings.

ALEXANDER H. ISENBERG.

References Cited in the file of this patent

UNITED STATES PATENTS

| Number | Name | Date |
| --- | --- | --- |
| 247,432 | Strohm | Sept. 20, 1881 |
| 1,317,495 | Hessel | Sept. 30, 1919 |
| 1,871,508 | Gardner | Aug. 16, 1932 |
| 1,969,374 | Kleffel | Aug. 7, 1934 |
| 2,243,427 | Kleffel | May 27, 1941 |
| 2,297,146 | Guirl | Sept. 29, 1942 |
| 2,330,966 | Gottwald et al. | Oct. 5, 1943 |
| 2,347,855 | Varga | May 2, 1944 |
| 2,410,308 | Scharwath | Oct. 29, 1946 |
| 2,451,145 | Baker et al. | Oct. 12, 1948 |